(12) United States Patent
Kim et al.

(10) Patent No.: US 9,539,970 B2
(45) Date of Patent: Jan. 10, 2017

(54) AIRBAG SENSOR MODULE AND CAR BODY INTEGRATED WITH AIRBAG SENSOR MODULE

(71) Applicants: KOREA INSTITUTE OF INDUSTRIAL TECHNOLOGY, Chungcheongnam-do (KR); SIN YEONG CO., LTD., Gyeongsangbuk-do (KR)

(72) Inventors: Jun Ki Kim, Gyeonggi-do (KR); Chang Woo Lee, Gyeonggi-do (KR); Se Hoon Yoo, Incheon (KR); Jung Hwan Bang, Incheon (KR); Yong Ho Ko, Incheon (KR); Jeong Han Kim, Seoul (KR); Jong Dock Seo, Daegu (KR); Dea Keun Kim, Gyeonggi-do (KR); Kwang Woo Won, Gyeonggi-do (KR)

(73) Assignees: KOREA INSTITUTE OF INDUSTRIAL TECHNOLOGY, Gyeongsangbuk-Do (KR); SIN YEONG CO., LTD., Gyeongsangbuk-Do (KR)

( * ) Notice: Subject to any disclaimer, the term of this patent is extended or adjusted under 35 U.S.C. 154(b) by 0 days.

(21) Appl. No.: 14/429,591

(22) PCT Filed: Sep. 23, 2013

(86) PCT No.: PCT/KR2013/008480
§ 371 (c)(1),
(2) Date: Mar. 19, 2015

(87) PCT Pub. No.: WO2014/046500
PCT Pub. Date: Mar. 27, 2014

(65) Prior Publication Data
US 2015/0232051 A1    Aug. 20, 2015

(30) Foreign Application Priority Data

Sep. 20, 2012  (KR) ........................ 10-2012-0104599
Feb. 15, 2013  (KR) ........................ 10-2013-0016529

(51) Int. Cl.
*B60R 21/0136*  (2006.01)
*B62D 25/04*  (2006.01)
(Continued)

(52) U.S. Cl.
CPC ......... *B60R 21/0136* (2013.01); *B60R 21/017* (2013.01); *B60R 21/16* (2013.01);
(Continued)

(58) Field of Classification Search
CPC ... B60R 21/0136; B60R 21/0132; B60R 21/34
(Continued)

(56) References Cited

U.S. PATENT DOCUMENTS 6,328,126 B2 * 12/2001 Breed .......................... 180/274
6,929,282 B1 * 8/2005 Zoratti ................ B60R 21/0136
                                                                180/274
(Continued)

FOREIGN PATENT DOCUMENTS

JP    2003510216    3/2003
JP    2006266878    10/2006
(Continued)

OTHER PUBLICATIONS

ISR cited in PCT/KR2013/008480 dated Mar. 27, 2014.

*Primary Examiner* — Faye M Fleming
(74) *Attorney, Agent, or Firm* — Workman Nydegger

(57) ABSTRACT

The present invention relates to an airbag sensor module which detects the amount of deformation of a car body so as to detect a collision during a car collision and which is attached to the car body in an adhesive manner, and the car (Continued)

body which is integrated with the airbag sensor module. One embodiment of the present application discloses the airbag sensor module mounted in an adhesive manner, comprising: a main substrate which is attached to the car body in an adhesive manner; and a collision detection sensor section which is formed on the main substrate, and which detects whether the car body collides by including a strain sensor for measuring the amount of deformation by being deformed along with the deformation of the car body caused by a collision thereof.

13 Claims, 5 Drawing Sheets

(51) Int. Cl.
- *B60R 21/16* (2006.01)
- *B60R 21/017* (2006.01)
- *G01L 1/22* (2006.01)
- *B60R 21/34* (2011.01)
- *B60R 21/01* (2006.01)
- *B60R 21/0132* (2006.01)

(52) U.S. Cl.
CPC ............... *B60R 21/34* (2013.01); *B62D 25/04* (2013.01); *G01L 1/22* (2013.01); *B60R 21/0132* (2013.01); *B60R 2021/01006* (2013.01); *B60R 2021/01088* (2013.01); *B60R 2021/01211* (2013.01)

(58) Field of Classification Search
USPC .......................................................... 280/735
See application file for complete search history.

(56) References Cited

U.S. PATENT DOCUMENTS

| | | |
|---|---|---|
| 7,098,778 B1 | 8/2006 | Zoratti et al. |
| 7,290,437 B1 | 11/2007 | Tanaka et al. |
| 2007/0251294 A1 | 11/2007 | Tanaka et al. |
| 2008/0243342 A1* | 10/2008 | Breed ................. B60R 21/0132 701/45 |
| 2009/0210114 A1* | 8/2009 | Baumann ............ B60R 21/0134 701/45 |

FOREIGN PATENT DOCUMENTS

| KR | 20110115042 | 10/2011 |
|---|---|---|
| KR | 20110121939 | 11/2011 |

* cited by examiner

AIRBAG SENSOR MODULE AND CAR BODY INTEGRATED WITH AIRBAG SENSOR MODULE

TECHNICAL FIELD

The present invention relates to an airbag sensor module which detects the amount of deformation of a car body so as to detect a collision during a car collision and which is attached to the car body in an adhesive manner and the car body which is integrated with the airbag sensor module.

BACKGROUND ART

Recently, the interest in the safety at the time of collision of the car is increased and the application of an airbag system is enlarged.

The airbag system is an apparatus for protecting a passenger in the car with being developed at the time of collision of the car.

The airbag system may comprise a sensor module capable of detecting a collision of a car, a control section for receiving a signal detected by the sensor module and deciding the development of an airbag according to the strength of the signal, and the airbag which is developed according to the signal of the control section.

The sensor module consists in general of a collision sensor and is mounted on a main collision expecting portion of the car body, and the airbag is provided at main portion of the inside of the space where the passenger sits.

Therefore, when a car collides, an impact therefrom is transmitted to the sensor module, and the control section decides whether the air bag is deployed by judging the amount of the impact measured by the sensor module, and develops the airbag when the amount of the impact is judged to reach a predetermined level.

However, the conventional airbag system described above has problems as follows:

First, the sensor module of the conventional airbag system is fixed to the car body by means of a bolt and the like as described in Korean Utility Model Application No. 20-1999-0024432, which has been already laid open, such a fixing method requires an additional separate process in the assembly of the car body, thereby making the production process of a car complicated.

Second, since the sensor module of the conventional airbag system is fixed to the car body by means of a bolt and the like, there is a problem in that a miss operation of the sensor may happen in the case where the fastening of the bolt is loosened due to a continuous vibration or external force caused during the travel of the car.

Third, the sensor module of the conventional airbag system detects the development of the airbag by using the collision sensor, and the collision sensor is configured to detect only when a significantly large impact is directly applied to prevent the miss operation. Therefore, there may arises a case of not capable of detecting the time when the airbag has to be developed such as a case where the impact is applied to the portion where the collision sensor is not provided or a case where the amount of impact is small, however, the amount of deformation of a car body is large.

Fourth, the conventional airbag system connects the collision sensor and an ECU of the car body by means of wiring, however, the connection operation may require an additional process and there may be a risk of miss operation in a case where the wire is defective upon the aging of the car.

DISCLOSURE

Technical Problem

The present invention is to solve the problems described above, and the object of the present invention is to provide a car body integrated with an airbag sensor module which simplifies the production process, removes the risk of loosening the fixation, is mounted in an adhesive manner, and may provide an improved passenger protection effect by precisely detecting the collision by measuring not only the impact applied to the car body upon the collision but also the amount of deformation of the car body.

The objects of the present invention are not limited to the objects described above, and other objects not described above will be obvious to the persons having an ordinary knowledge in this field from the description below.

Technical Solution

To achieve the objects described above, according to an aspect of the present invention, an airbag sensor module mounted in an adhesive manner may be provided, comprising: a main substrate attached to a car body in the adhesive manner; and a collision detecting sensor section for detecting the presence of the collision of a car body, which is formed on the main substrate and comprises a strain sensor for measuring the amount of deformation that is deformed according to a deformation of the car body according to the collision of the car body.

The main substrate may be composed of a Flexible Printed Circuit Board having the flexibility.

The collision detecting sensor section may comprises: a strain sensor that is closely attached to the car body and deformed according to the deformation of the car body; and a control section for calculating a deformation amount of the car body by using a figure measured at the strain sensor and for deciding a development of the airbag by using the measured amount of deformation.

The airbag sensor module may further comprise a communication section for transmitting data measured at the collision detecting sensor section to the control section for controlling the development of the airbag of the car body.

The communication section may be configured to transmit to the control section by using a radio communication.

The airbag sensor module may further comprise a power supply for supplying the electric power to the collision detecting sensor section and the communication section.

The power supply may comprise a battery for storing the electric power.

Further, the power supply may comprise a vibration generation device for generating the electric power by using the vibration generated according to the travel of the car.

The collision detecting sensor section may further comprise an impact detecting sensor for detecting the impact applied to the car body.

Meanwhile, a car body integrated with an airbag sensor module may be provided, comprising: a car body provided with a pillar section which supports a ceiling of the car body from the bottom section of the car body or supports a wind shield glass of the car body; and an airbag sensor module according to one of the claims 1 to 9 provided on the pillar section.

The pillar section may be formed in such a way that plural sheets of members are overlapped, and a main substrate of the airbag sensor module may be attached to a member placed at the inner side among the plural sheets of members forming the pillar section.

A recess for housing the main substrate may be formed at a portion of the pillar section where the main substrate of the airbag sensor module is attached.

It should be understood that different embodiments of the invention, including those described under different aspects of the invention, are meant to be generally applicable to all aspects of the invention. Any embodiment may be combined with any other embodiment unless inappropriate. All examples are illustrative and non-limiting.

Advantageous Effects

According to the airbag sensor module and the car body which is integrated with the airbag sensor module of the present invention, there are effects as follows:

First, since the attachment of the airbag sensor module does not require the additional process when producing a car and may be simply integrated into the production process of the car, the production process may be simplified.

Second, since the adhesive manner instead of the bolt screwing may be used in mounting the airbag sensor module, there is no risk of the fixation of the airbag sensor module being loosened even when the external force such as the vibration and the like is applied thereto for a long time.

Third, since the amount of impact and the amount of deformation of the car are considered together in deciding the development of the airbag of the car body, the airbag may be operated if the amount of deformation larger or equal to a preset amount thereof is detected although the impact does not precisely strike the airbag sensor module, and thus the development of the airbag may be effectively and precisely decided.

Fourth, since the airbag sensor module and the control section for deciding the development of the airbag may be configured to perform the radio communication, it does not require the additional wire, the operation of wiring is not necessary, the production process may be shortened, and there is no risk of miss operation according to the aging of the wire.

Fifth, since the airbag sensor module is positioned at a member placed at the inner side among the plural sheets of members forming the pillar section, the airbag sensor module may be protected at the time of subsequent process such as the electro-deposition process, painting process, or heat treatment process, and also protected against the corrosion due to the rain, wind or calcium chloride after the delivery.

The effects of the present invention are not limited to the effects described above, and other effects not described above will be obvious to the persons having an ordinary knowledge in this field from the description of the claims.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

BEST MODE FOR THE INVENTION

Figure 1:
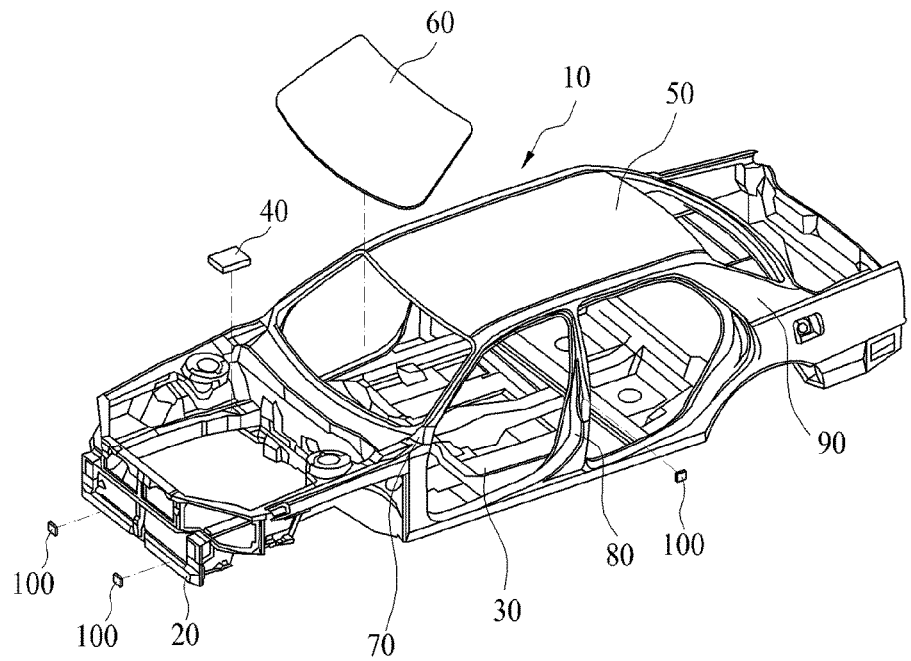
FIG. 1 is a perspective view of a car body illustrating the configuration where an airbag sensor module is mounted on the car body according to the present embodiment.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a perspective view illustrating an embodiment of a car body with which an airbag sensor module of the present invention is integrated.

The airbag sensor module is a sensor which detects a collision of the car body by measuring an amount of deformation of the car body according to the collision of car body, and may be mounted on a front reinforcement 20 and pillar sections such as B-pillar 30 which in general receive the largest impact and deformation at the time of the collision of the car.

In general, a plurality of pillars may be formed on the car body. In particular, a passenger car is in general provided with an A-pillar 70, B-pillar 80, and C-pillar 90, wherein the A-pillar 70 is arranged at the front side of a cabin and is formed to support a wind shield glass 60 and at the same time support a ceiling 50 of the car body from a bottom section 30, the B-pillar 80 is arranged at the middle part of the cabin and is formed to support the ceiling 50 of the car body from the bottom section 30, and the C-pillar 90 is arranged at the rear side of the cabin and is formed to support a rear side glass (not shown) and the ceiling of the car body.

Of course, a form of a pillar section consisting of the A-pillar 70, B-pillar 80, and C-pillar 90 may be varied according to the kind and form of the car.

In general, at the front side collision of the car, the largest impact and deformation may be applied to the front reinforcement 20, and at the lateral side collision, the largest impact and deformation may be applied to the B-pillar 80. In addition, even at the time of an off-set collision where the car is collided obliquely, the impact and deformation may be applied to the B-pillar 80.

Therefore, the airbag sensor module 100 according to the present embodiment may be mounted on the B-pillar 80 of the car body.

Of course, in the car body 10 with which the airbag sensor module 100 of the present invention is integrated, the position of mounting of the airbag sensor module 100 is not limited thereto, the airbag sensor module 100 may be mounted on the A-pillar 70 or the C-pillar 90 or other places, and a plurality of airbag sensor modules 100 may be installed at variety places.

However, in the description of the present embodiment, the airbag sensor module 100 is mounted on the B-pillar 80 of the car body.

Figure 2:
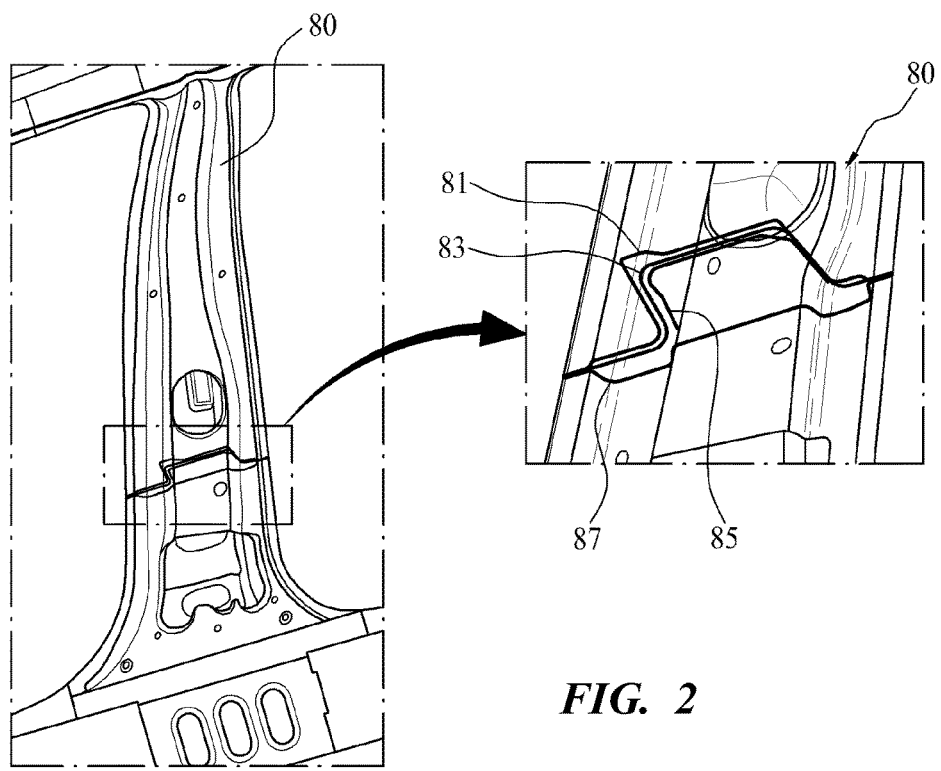
FIG. 2 is a perspective view enlarging a B-pillar of the FIG. 1.

FIG. 2 is a view enlarging the B-pillar of the car body.

Figure 3:
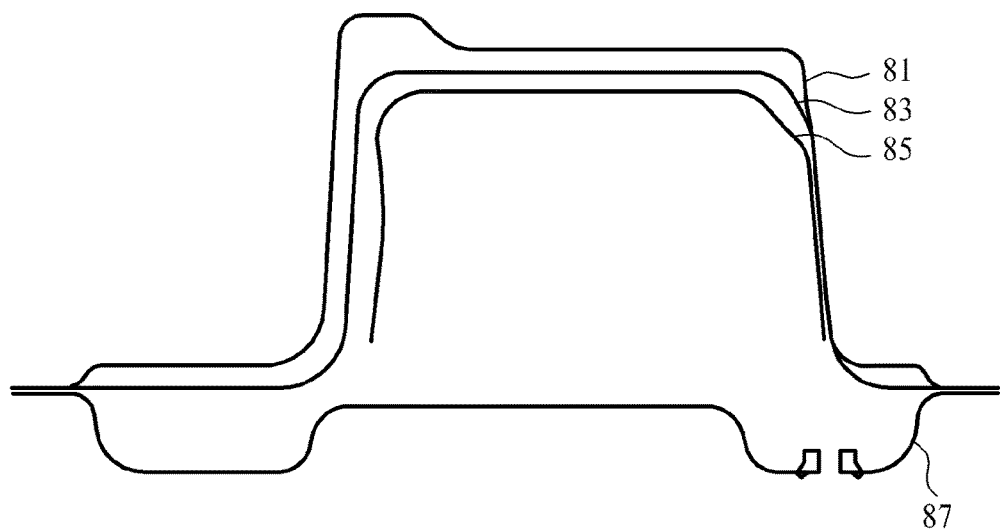
FIG. 3 is a sectional view of the FIG. 2.

Meanwhile, the B-pillar 80 may be, as shown in FIGS. 2 and 3, formed in such a way that plural sheets of members are bent and mutually overlapped to achieve a high rigidity.

The present embodiment will be described by taking an example where the B-pillar 80 consists of an exterior panel 81 directing toward outside of the car body 10, an interior panel 87 directing toward the cabin of the car body 10, and a first reinforcing bracket 83 and second reinforcing bracket 85 provided between the exterior panel 81 and the interior panel 87.

At this time, the airbag sensor module 100 may be attached to a member placed inside of the B-pillar 80 such as the first reinforcing bracket 83 or the second reinforcing bracket 85 among the plural sheets of members.

Therefore, the airbag sensor module 100 may be attached when the car body 10 is produced so that an attachment process of the airbag sensor module 100 may be integrated into the production process of the car body 10, and the airbag sensor module 100 may be protected from an influence of electro-deposition process or heat treatment process in the car manufacturing process after the production of the car body, and also protected from environmental factors such as rain, wind, and calcium chloride encountered after the production of the car.

Figure 4:
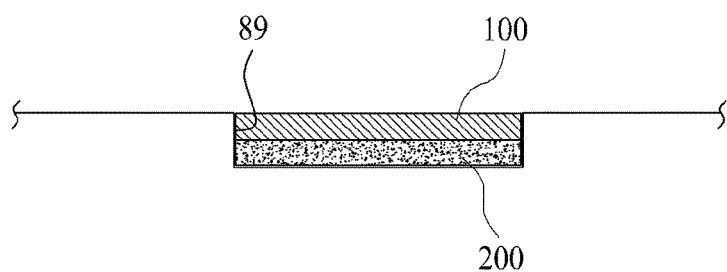
FIG. 4 is a sectional view illustrating a part to which the airbag sensor module is attached.

Meanwhile, as shown in FIG. 4, a recess 89 for housing the airbag sensor module 100 may be formed at a position on the first reinforcement bracket 83 or second reinforcement bracket 85 where the airbag sensor module 100 is attached.

Therefore, the airbag sensor module 100 may be attached to the inside of the recess 89 by means of an adhesive 200. In addition, the recess 89 may be formed to have a depth so that the exterior surface of the recess 89 and the airbag sensor module 100 are flush in a condition where the airbag sensor module 100 is attached.

At this time, the adhesive 200 used in attachment of the airbag sensor module 100 may be an adhesive of extra high rigidity to keep the attachment condition semi-permanently.

In addition, in general, when an impact is applied to a member both ends of which are supported, the portion having the largest amount of deformation may be the middle part between the both ends. Furthermore, the B-pillar 80 has a form of a member both ends of which are supported by the bottom section 30 and the ceiling 50, respectively. Therefore, the airbag sensor module 100 may further sensitively measure the amount of deformation of the B-pillar 80 by being attached to the middle part between the both ends each connected to the bottom section 30 and the ceiling 50 of the B-pillar 80.

Therefore, when the airbag sensor module 100 is mounted on the car body 10, a separate bolt screwing process is not necessary, so that the mounting process of the airbag sensor module may be significantly simplified and the production process thereof may be significantly simplified since the mounting process of the airbag sensor module 100 may be not separated as a separate process but integrated into the production process of the car body.

Hereafter, an embodiment of the airbag sensor module of the present invention will be described.

Figure 5:
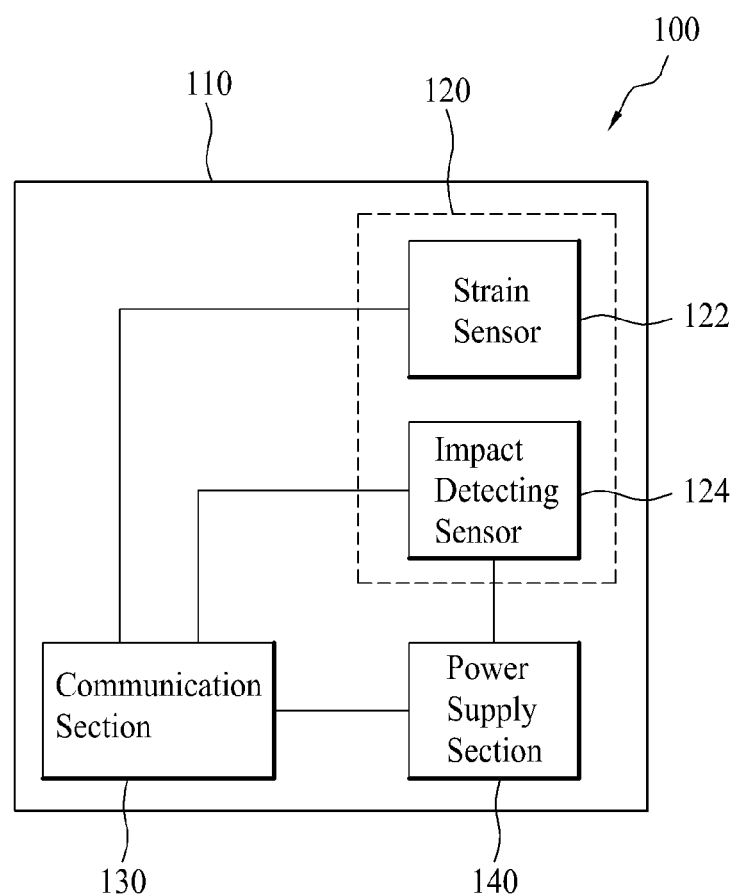
FIG. 5 is a view illustrating a schematic construction of the airbag sensor module according to the present embodiment.

The airbag sensor module may comprise, as shown in FIG. 5, a main substrate 110 and a collision detecting sensor section 120.

The main substrate 110 may be mounted on the car body 10 in an adhesive manner, and the collision detecting sensor section 120 may be formed on the main substrate 110.

At this time, the main substrate 110 may be formed of a Flexible Printed Circuit Board (FPCB) having flexibility so that the main substrate 110 may be closely attached to the B-pillar of the car body by means of the adhesive.

The collision detecting sensor section 120 may comprise a strain sensor 122 for measuring the amount of deformation of the car body 10 according to the collision or impact.

The strain sensor 122 may be closely attached to the car body 10 so as to be deformed together with the deformation of the car body 10 so as to measure the amount of deformation thereof.

Figure 6:
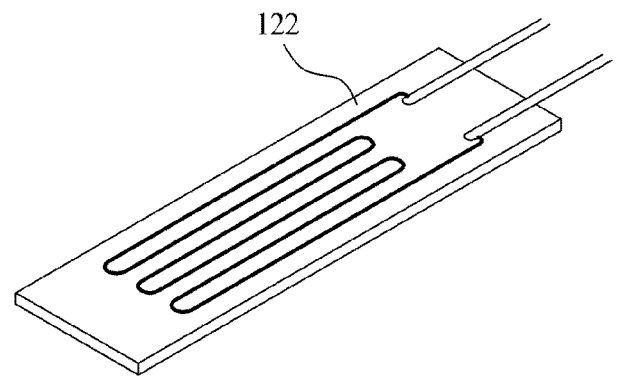
FIG. 6 is a perspective view illustrating an example of a strain sensor of FIG. 5.
Figure 7:
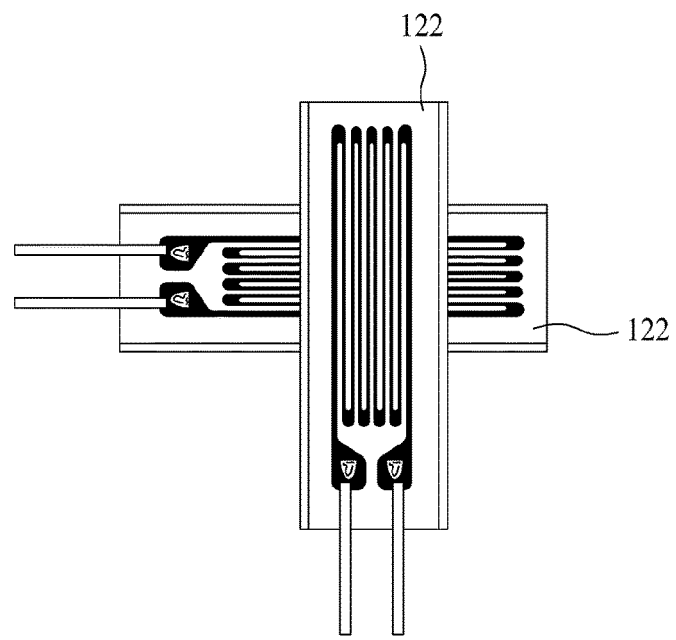
FIG. 7 is a plan view illustrating other example of the strain sensor of FIG. 5.

The strain sensor 122 may be added to the main substrate 110 or formed on the main substrate 110 in a form shown in FIG. 6. In addition, if the strain sensors 122 are arranged in different directions as shown in FIG. 7, they may measure the amount of deformation in different directions.

That is, since the main substrate 110 formed with the strain sensor 122 is closely attached to the car body 10 in the adhesive manner, the main substrate 110 is deformed according to the deformation of the position of the car body 10 where the main substrate 110 is attached, and the strain sensor 122 may more precisely measure the deformation amount of the car body.

In general, the strain sensor 122 is configured to output different resistance value, voltage or current data according to the amount of deformation, and a communication section 130 may be further provided which transmit thus output data to a control section 40 which judges whether an airbag provided on the car body is developed or not.

At this time, the control section 40 is configured to decide the development of the airbag by calculating the deformation amount of the car body by using the data output from the strain sensor 122, and is mounted on the main substrate 110 or to be wired on the main substrate 110 by being provided in a form of a chip.

Otherwise, the control section may be provided for each airbag mounted on the car body to decide the development of relevant airbag, or may be integrated into an ECU (Electronic Control Unit: 40, refer to FIG. 1) which control an engine or a transmission of the car body, or may be provided separately from the ECU.

Describing in further detail, since the shorter the time when the large amount of deformation occurs, the larger the danger to the passenger, the control section 40 calculates the amount of deformation per unit time by using the amount of deformation measured at the strain sensor 122 and may apply it when deciding the development of the airbag. That is, the control section 40 may be configured to develop the airbag in the case where the amount of deformation larger than a value preset is measured for the unit time or a certain time.

The communication section 130 may be wired to the control section 40, however, in the present embodiment, an example is taken where the communication section 130 is configured to transmit the data measured at the collision detecting sensor section 120 to the control section 40 by using an radio communication.

The communication section 130 may be formed with RF communication circuit to communicate with the control section 40. However, in the present invention, the constitution of the communication section 130 is not limited to the RF communication circuit, and may have other communication circuits.

Furthermore, a power supply 140 for supplying the electric power to the collision detecting sensor section 120 and the communication section 130 may be further provided.

The power supply 140 may be composed of a battery which stores the electric power and supplies it to the collision detecting sensor section 120 and the communication section 130.

Otherwise, the power supply 140 may be configured to generate the electric power and supply it to the collision detecting sensor section 120 and the communication section 130. The power supply 140 may be configured to generate the electric power by using a vibration inevitably produced at the time of the travel of the car.

Figure 8:
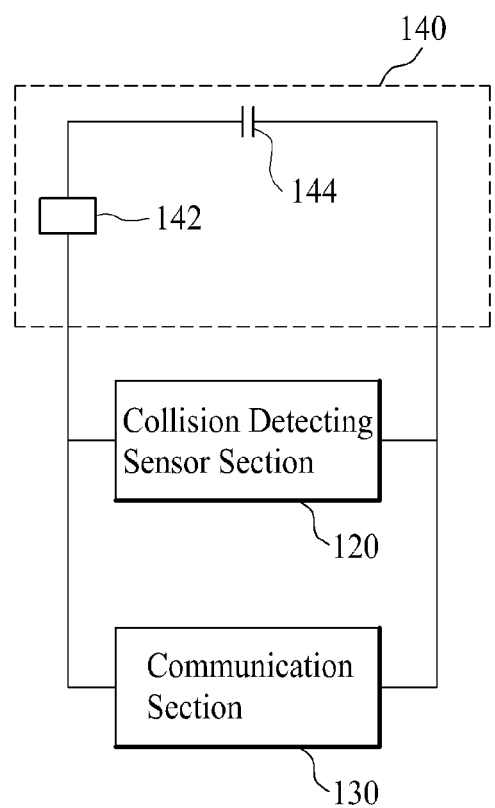
FIG. 8 is a drawing illustrating a schematic construction of a power supply of FIG. 5.

Therefore, the power supply 140 may comprise, as shown in FIG. 8, a piezo element 142 which may generate the electric power by using vibration energy and a capacitor 144 which stores the electric power generated by the piezo element 142. Of course, the power supply 140 may comprise other constituents than the piezo element 142 and the capacitor 144.

Therefore, since the airbag sensor module 100 may communicate with the control section 40 of the car body in the radio communication and also may self generate the electric power required in operation and thus it requires no separate wire.

Of course, the power supply 140 may be configured to be supplied with the electric power from the outside in addition to storing or generating the electric power.

Meanwhile, the collision detecting sensor section 120 may further comprise an impact detecting sensor 124 which detects the impact of the car body in addition to the strain sensor 122 which measures the deformation of the car body. The impact detecting sensor 124 may be formed on the main substrate 110 or wired on the main substrate 110 by being composed of a separate module.

That is, the airbag sensor module 100 may more precisely decide the development of the airbag by considering the data of the amount of deformation together with the data of the amount of impact measured by measuring the amount of impact applied.

While the present invention has been described with respect to the specific embodiments, it will be apparent to those skilled in the art that various changes and modifications may be made without departing from the spirit and scope of the invention as defined in the following claims.

The invention claimed is:

1. A car body integrated with an airbag sensor module comprising:
   a car body provided with a pillar section which supports a ceiling of the car body from a bottom section of the car body or supports a wind shield glass of the car body; and
   an airbag sensor module provided on the pillar section and mounted in an adhesive manner, the airbag sensor module comprising:
      a main substrate attached to the car body in the adhesive manner; and
      a collision detecting sensor section for detecting the presence of a collision of the car body, which is formed on the main substrate and comprises a strain sensor for measuring an amount of deformation that is deformed according to a deformation of the car body according to the collision of the car body.

2. The car body integrated with an airbag sensor module of claim 1, wherein the main substrate is comprised of a flexible printed circuit board having flexibility.

3. The car body integrated with an airbag sensor module of claim 1, wherein the collision detecting sensor section comprises:
   a strain sensor that is closely attached to the car body and is deformed according to the deformation of the car body in a collision; and
   a control section for calculating a deformation amount of the car body in a collision by using a figure measured at the strain sensor and for deciding a development of the airbag by using the measured amount of deformation.

4. The car body integrated with an airbag sensor module of claim 3, wherein the collision detecting sensor section further comprises an impact detecting sensor for detecting an impact applied to the car body.

5. The car body integrated with an airbag sensor module of claim 1, further comprising a communication section for transmitting data measured at the collision detecting sensor section to a control section for controlling the development of an airbag of the car body in a collision.

6. The car body integrated with an airbag sensor module of claim 5, wherein the communication section is configured to transmit to the control section by using a radio communication.

7. The car body integrated with an airbag sensor module of claim 5, further comprising a power supply for supplying the electric power to the collision detecting sensor section and the communication section.

8. The car body integrated with an airbag sensor module of claim 7, wherein the power supply comprises a battery for storing the electric power.

9. The car body integrated with an airbag sensor module of claim 7, wherein the power supply comprises a vibration generation device for generating the electric power by using vibration generated during travel of the car.

10. The car body integrated with an airbag sensor module of claim 1, wherein
    the pillar section is formed in such a way that plural sheets of members are overlapped, and
    the main substrate of the airbag sensor module is attached to a member placed at an inner side among the plural sheets of members forming the pillar section.

11. The car body integrated with an airbag sensor module of claim 1, wherein a recess for housing the main substrate is formed at a portion of the pillar section where the main substrate of the airbag sensor module is attached.

12. An airbag sensor module mounted in an adhesive manner comprising:
    a main substrate attached to a car body in the adhesive manner;
    a collision detecting sensor section for detecting the presence of a collision of a car body, which is formed on the main substrate and comprises a strain sensor for measuring an amount of deformation that is deformed according to a deformation of the car body according to the collision of the car body; and
    a communication section for transmitting data measured at the collision detecting sensor section to a control section for controlling the development of the airbag of the car body,
    wherein the communication section is configured to transmit to the control section by using a radio communication.

13. An airbag sensor module mounted in an adhesive manner comprising:
- a main substrate attached to a car body in the adhesive manner;
- a collision detecting sensor section for detecting the presence of the collision of a car body, which is formed on the main substrate and comprises a strain sensor for measuring the amount of deformation that is deformed according to a deformation of the car body according to the collision of the car body;
- a communication section for transmitting data measured at the collision detecting sensor section to a control section for controlling the development of the airbag of the car body; and
- a power supply for supplying the electric power to the collision detecting sensor section and the communication section.

* * * * *